US012601635B2

(12) United States Patent
Cao

(10) Patent No.: US 12,601,635 B2
(45) Date of Patent: Apr. 14, 2026

(54) MULTI-SENSOR SYNCHRONOUS NON-CONTACT MEASURING PROBE OF INFRARED THERMOMETER

(71) Applicant: FAMIDOC TECHNOLOGY CO., LTD., Dongguan (CN)

(72) Inventor: Liang Cao, Shenzhen (CN)

(73) Assignee: FAMIDOC TECHNOLOGY CO., LTD., Dongguan (CN)

( * ) Notice: Subject to any disclaimer, the term of this patent is extended or adjusted under 35 U.S.C. 154(b) by 359 days.

(21) Appl. No.: 18/119,835

(22) Filed: Mar. 10, 2023

(65) Prior Publication Data

US 2023/0280213 A1     Sep. 7, 2023

(30) Foreign Application Priority Data

Nov. 14, 2022     (CN) .......................... 202223019572.3

(51) Int. Cl.
G01J 5/02        (2022.01)
G01J 5/00        (2022.01)

(52) U.S. Cl.
CPC ........... G01J 5/0205 (2013.01); G01J 5/0025 (2013.01)

(58) Field of Classification Search
None
See application file for complete search history.

(56)                 References Cited

U.S. PATENT DOCUMENTS

2011/0163773  A1      7/2011   Zelder et al.
2016/0258733  A1      9/2016   Shimaoka et al.
2016/0258738  A1      9/2016   Shimaoka et al.
2019/0212214  A1*     7/2019   Liang ................... A61B 5/0075

* cited by examiner

*Primary Examiner* — Erica S Lin
(74) *Attorney, Agent, or Firm* — Hemisphere Law, PLLC

(57)                 ABSTRACT

The present disclosure discloses a multi-sensor synchronous non-contact measuring probe of an infrared thermometer, comprising a sensor fixing sleeve and a pressing block arranged at the inner end of the sensor fixing sleeve, wherein at least two infrared sensors are arranged on the pressing block, the sensor fixing sleeve is provided with optical channels with the same number as that of the infrared sensors, the detection surface of each of the infrared sensors is interfaced with a corresponding optical channel, and the infrared sensors are connected with MCU chips.

7 Claims, 9 Drawing Sheets

A

B

C

D

MULTI-SENSOR SYNCHRONOUS NON-CONTACT MEASURING PROBE OF INFRARED THERMOMETER

TECHNICAL FIELD

The present disclosure relates to the technical field of infrared thermometers, in particular to a multi-sensor synchronous non-contact measuring probe of an infrared thermometer.

BACKGROUND

It is well-known that according to the law of blackbody radiation, all objects above absolute zero in nature are constantly radiating energy outward. The magnitude of the outward radiating energy of an object and the distribution thereof by wavelength are closely related to the surface temperature thereof. The higher the temperature of an object, the stronger the infrared radiation ability that the object emits.

The infrared thermometer uses an infrared receiving sensor to acquire the infrared radiation emitted by the human skin surface, accurately measures the human skin temperature, and cooperates with an internal algorithm of the thermometer to correct the temperature difference between the forehead and the actual human body temperature, thus obtaining the accurate human body temperature.

Non-contact measurement is generally used for the external surface test of a human body such as the forehead. In order to achieve non-contact measurement, it is necessary to control the object distance ratio of a product to prevent the measurement area from being too large and exceeding the measurement target when the distance is too far, that is, it is necessary to control the acquisition optical path of the sensor.

At present, all the existing measuring probes of infrared thermometers carry out measurement using a single sensor, and the temperature values measured by infrared thermometers often depend entirely on the results measured by this single sensor. However, the range of the human body skin surface detected by a single sensor is small and limited. In the process of actual use, the temperature measured value often changes because of the change of the detected position. This will cause the existing infrared thermometer to carry out measurement repeatedly for many times, and then the middle value is taken, so that the measured results are inaccurate.

SUMMARY

Aiming at the shortcomings in the prior art, the present disclosure aims to provide a multi-sensor synchronous non-contact measuring probe of an infrared thermometer.

In order to achieve the above purpose, the present disclosure uses the following technical scheme.

The present disclosure relates to a multi-sensor synchronous non-contact measuring probe of an infrared thermometer, comprising a sensor fixing sleeve and a pressing block arranged at the inner end of the sensor fixing sleeve, wherein at least two infrared sensors are arranged on the pressing block, the sensor fixing sleeve is provided with optical channels with the same number as that of the infrared sensors, the detection surface of each of the infrared sensors is interfaced with a corresponding optical channel, and the infrared sensors are connected with MCU chips.

Preferably, the pressing block is a hardware plate.

Preferably, the pressing block is fixedly installed on the inner end of the sensor fixing sleeve through fasteners.

Preferably, the optical channels of each of the infrared sensors are arranged in parallel with each other, so that the detection areas obtained by the infrared sensors are staggered or have overlapping edges; alternatively, the optical channels of each of the infrared sensors are arranged at an oblique angle, so that the centers of the detection areas obtained by the infrared sensors are overlapped with each other.

Preferably, the optical channel is parabolic or triangular, elliptical or stepped.

Due to the use of the above scheme, the present disclosure uses a plurality of infrared sensors to synchronously detect the skin temperature of a human body, and corresponding compensation is carried out depending on temperature values detected by the plurality of infrared sensors, so that a final value of the human body temperature detection is obtained, and the accuracy of human body temperature detection is effectively improved.

DETAILED DESCRIPTION OF THE EMBODIMENTS

Figure 1:
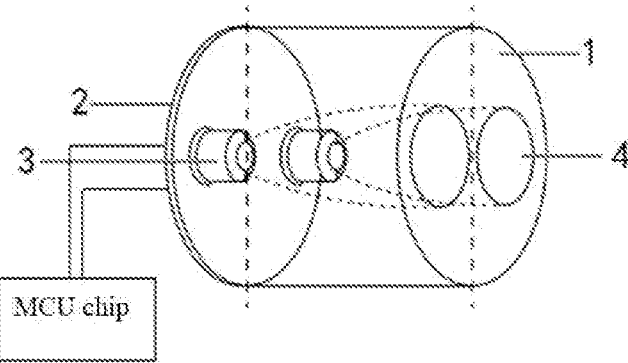
FIG. 1 is a schematic structural diagram of an embodiment of the present disclosure.
Figure 2:
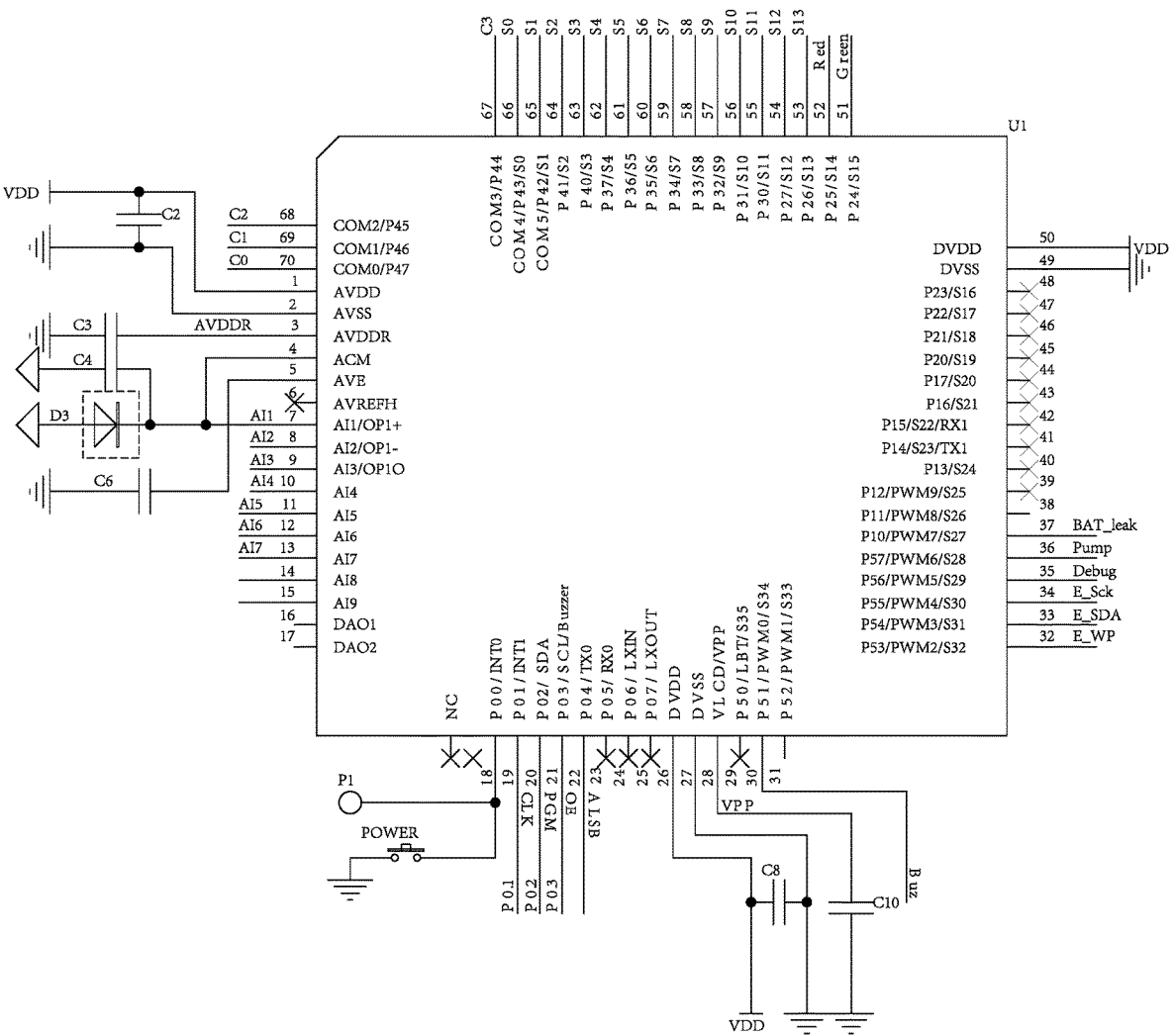
FIG. 2 is a schematic diagram of a circuit structure of an MCU chip according to an embodiment of the present disclosure.

In order to make the object, the technical scheme and advantages of the present disclosure clearer, the present disclosure will be described in detail hereinafter with reference to drawings and embodiments. It should be understood that the specific embodiments described here are only used to explain the present disclosure, rather than limit the present disclosure.

In the description of the present disclosure, it should be understood that the orientational or positional relationships indicated by the terms such as "center", "longitudinal", "transverse", "length", "width", "thickness", "up", "down", "front", "back", "left", "right", "vertical", "horizontal", "top", "bottom", "inside", "outside", "clockwise", "counterclockwise" are based on the orientational or positional relationships shown in the drawings only for the convenience of describing the present disclosure and simplifying the description, rather than indicate or imply that the referred devices or elements must have a specific orientation, be constructed and operated in a specific orientation, and therefore should not be construed as limiting the present disclosure. In addition, the terms such as "first" and "second" are only used for the purpose of description, and cannot be understood as indicating or implying relative importance or implicitly indicating the number of indicated technical features. Therefore, the features defined with "first" and "second" can include one or more of the features explicitly or implicitly. In the description of the present disclosure, "a plurality of" means two or more, unless otherwise specifically defined.

In the description of the present disclosure, it should be noted that, unless otherwise specified and defined expressly, the terms such as "install", "link" and "connect" should be understood broadly, for example, it can be fixed connection, detachable connection or integral connection; or mechanical connection or electrical connection; or direct connection or indirect connection through an intermediate medium, or internal communication between two elements or interaction between two elements. For those skilled in the art, the specific meanings of the above terms in the present disclosure can be understood according to specific situations.

As shown in FIG. 1 to FIG. 9, a multi-sensor synchronous non-contact measuring probe of an infrared thermometer provided by this embodiment comprises a sensor fixing sleeve 1 and a pressing block 2 arranged at the inner end of the sensor fixing sleeve 1. At least two infrared sensors 3 are arranged on the pressing block 2. The sensor fixing sleeve 1 is provided with optical channels 4 with the same number as that of the infrared sensors 3. The detection surface of each of the infrared sensors 3 is interfaced with a corresponding optical channel 4. The infrared sensors 3 are connected with MCU chips. The infrared sensor 3 can convert an infrared signal within the measurement target range into an electrical signal and send the signal to the MCU chip. The model of the MCU chip is XWICO28, which is provided with an MCU with a high-precision ADC. After acquiring the measurement signal, the MCU chip acquires the electrical signal output by the sensor through the ADC, respectively, and converts it into the corresponding target temperature through program setting. The two temperatures are then used as input to generate a final temperature through a compensation algorithm, and then the final temperature is displayed through an LCD. The compensation algorithm can be the average of two target temperatures.

In this embodiment, a plurality of infrared sensors 3 are used to synchronously detect the skin temperature of a human body, and corresponding compensation is carried out depending on temperature values detected by the plurality of infrared sensors 3, so that a final value of the human body temperature detection is obtained, and the accuracy of human body temperature detection is effectively improved.

Further, the optical channels 4 of each of the infrared sensors 3 in this embodiment are arranged in parallel with each other, so that the detection areas obtained by the infrared sensors 3 are staggered or have overlapping edges; alternatively, the optical channels 4 of each of the infrared sensors 3 are arranged at an oblique angle, so that the centers of the detection areas obtained by the infrared sensors 3 are overlapped with each other.

In order to further illustrate the common structural design of the plurality of sensors in this embodiment, two and three sensors are specifically used for description.

Figure 3:
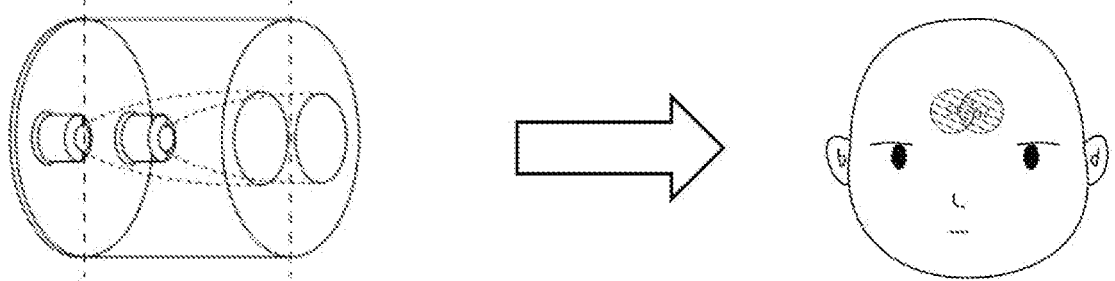
FIG. 3 and FIG. 4 are schematic structural diagrams of a central symmetric bisecting optical path design according to an embodiment of the present disclosure.
Figure 4:
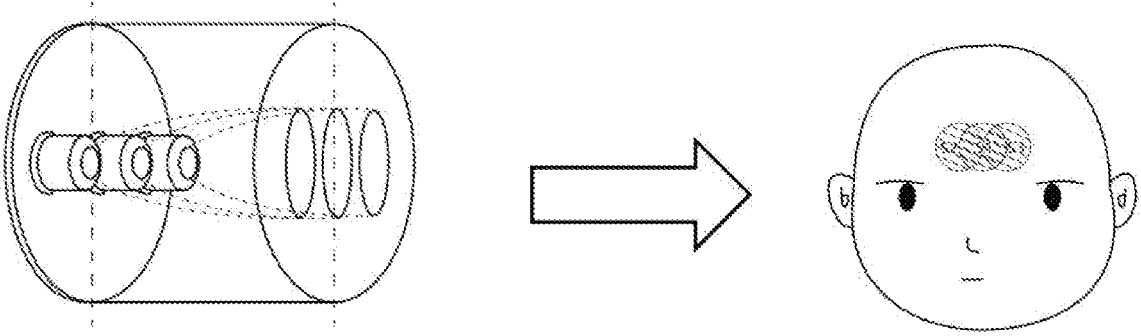

The central symmetric bisecting optical path design is as follows. Two infrared sensors 3 use the same optical path and are bilaterally symmetrically installed on the probe according to the center position of the temperature measuring probe, as shown in FIG. 3 and FIG. 4. Two or three infrared sensors 3 are equally distributed on the left and right sides according to the center line of the temperature measuring probe, and the optical channels 4 of the two sensors are the same. During measurement, the measuring target range is evenly distributed on the left and right sides. At the same, the forehead area is limited, and the measuring targets of the two sensors overlap slightly, so that the center position can be included in both sensors to ensure that the center position is only measured when the effect of temperature measurement is not worse than that of a single sensor on the market at present.

Figure 5:
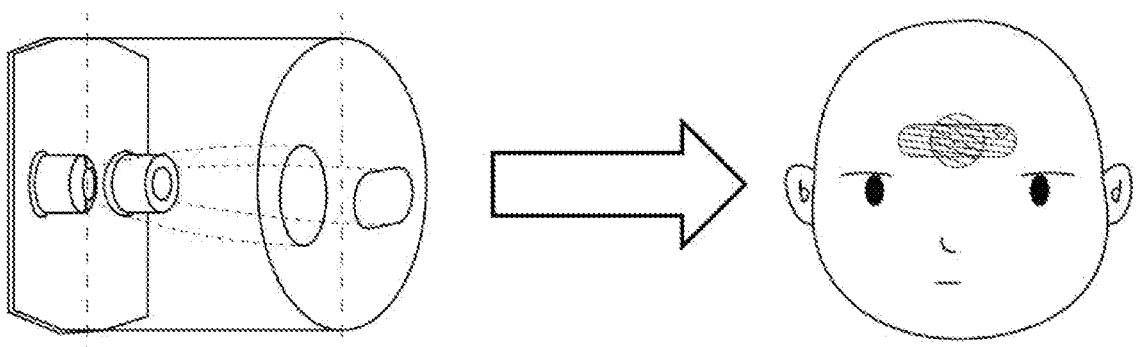
FIG. 5 and FIG. 6 are schematic structural diagrams of a left-right compensation optical path design according to an embodiment of the present disclosure.

The left-right compensation optical path design is as follows. Two sensors use different optical paths, which are placed at a certain included angle on the left and right sides (that is, the optical channels of each of the infrared sensors are arranged at an oblique angle), as shown in FIG. 5. The two sensors use different optical paths. One of the two sensors is used as a main detection sensor S1, and the other of the two sensors is used as a compensation sensor S2. The acquisition area of the main sensor after passing through the optical path is circular, which is the same as the conventional single sensor on the market at present. The acquisition area of the other compensation sensor after being designed with the optical path is elongated, which is used to obtain the position of forehead blood vessels and compensate for the temperature measurement results.

Figure 6:
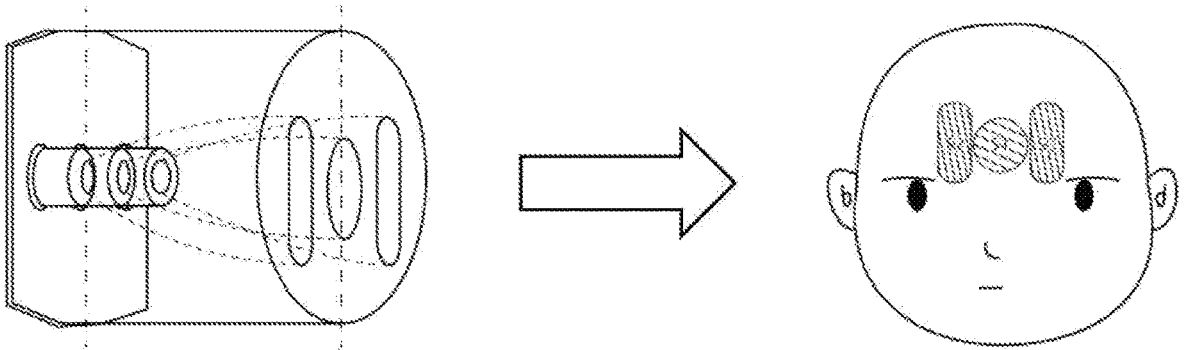

When the optical path design is to select three sensors for left-right compensation, the infrared sensors 3 located on both sides use the same optical path, that is, as compensation sensors S2 and S3, while the infrared sensor located in the middle uses another optical path, that is, as the main detection sensor S1, as shown in FIG. 6. The specific principle is the same as the optical path design of the left-right compensation described above.

Figure 7:
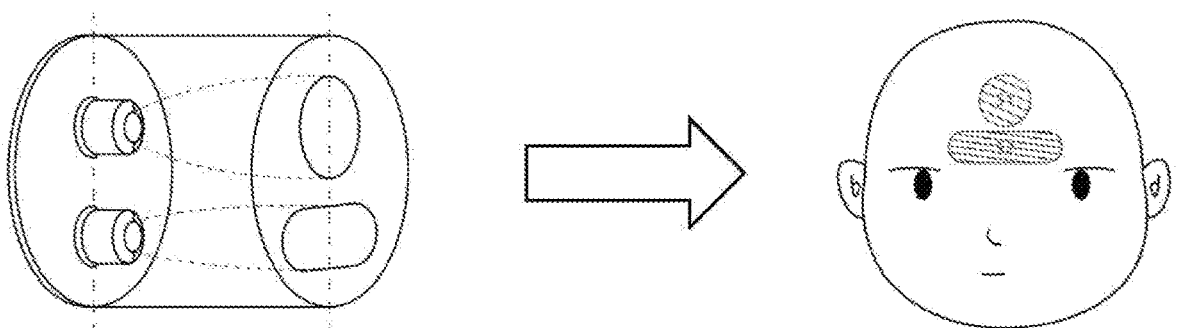
FIG. 7 and FIG. 8 are schematic structural diagrams of a down-compensation optical path design according to an embodiment of the present disclosure.

The down-compensation optical path design is as follows. Two sensors use different optical paths, which are placed on the center line from top to bottom, as shown in FIG. 7. The two sensors 3 use different optical paths. One of the two sensors is used as a main detection sensor S1, and the other of the two sensors is used as a compensation sensor S2. The acquisition area of the main sensor after passing through the optical path is circular, which is the same as the conventional single sensor on the market at present. The acquisition area of the other compensation sensor after being designed with the optical path is elongated, which is used to obtain the position of blood vessels below the target area and compensate for the temperature measurement results.

Figure 8:
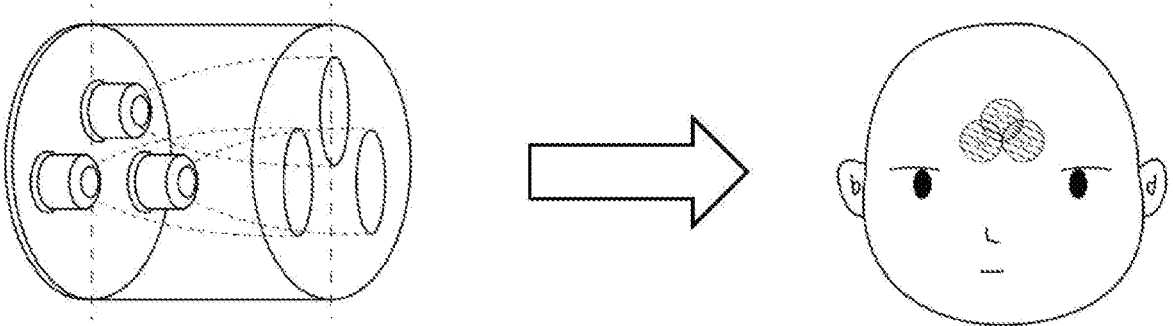

The three sensors use the same optical path, and use the projection mode with the center connecting line as a regular triangle, as shown in FIG. 8. One of the sensors which is located in the upper part is used as a main detection sensor. The acquisition area is circular, which is the same as the conventional single sensor on the market at present. The other two sensors are used as compensation sensors, which are used to obtain the position of blood vessels below the target area and compensate for the temperature measurement results.

Figure 9:
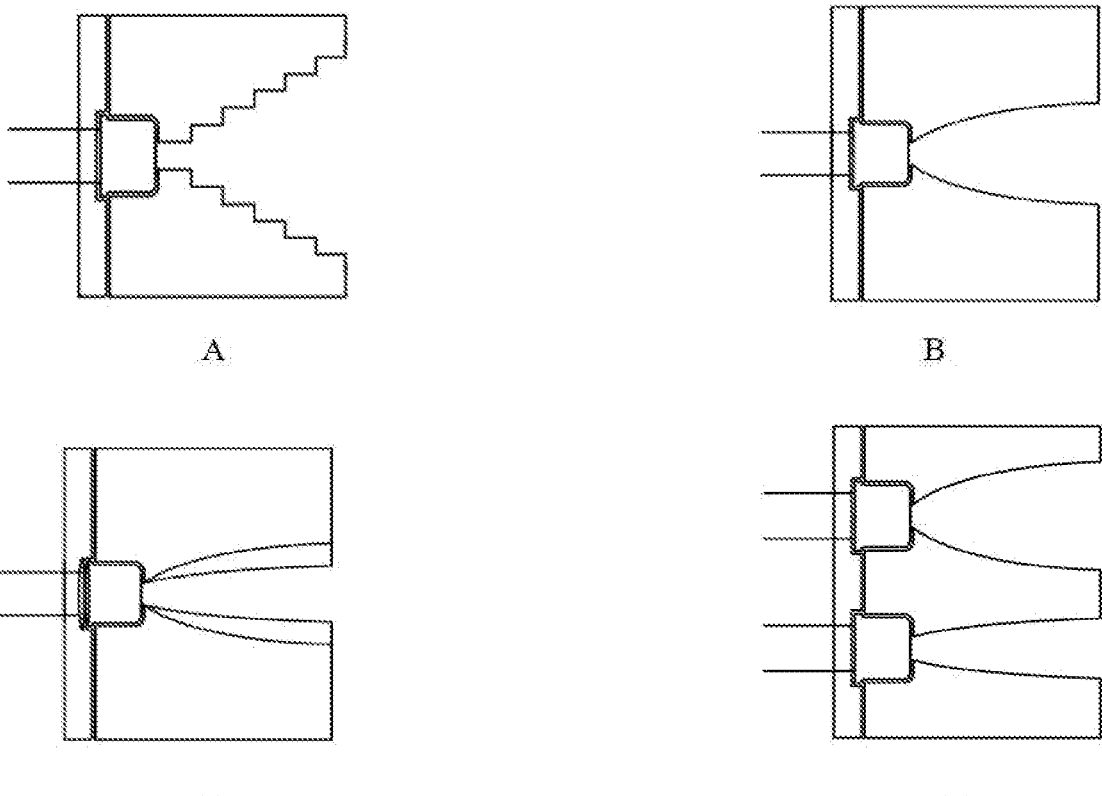
FIG. 9 is a schematic structural diagram of four specific forms of optical channels according to an embodiment of the present disclosure.

As for the specific form of the optical channel 4, four structural forms as shown in FIG. 9 can be used. The specific shape can be another of a parabola, a triangle, an ellipse and a step or the combination thereof.

Further, the pressing block 2 in this embodiment is a hardware plate, which is mainly used to fix the infrared sensor 3 and is locked on the sensor fixing sleeve 1 through screw holes. At the same time, in order to ensure the temperature balance of the infrared sensor 3, the pressing block is generally made of hardware (such as copper, stainless steel, zinc alloy, etc.). At the same time, in order to ensure a good heat preservation effect, the pressing block needs to keep close contact with the infrared sensor.

The above are only the preferred embodiments of the present disclosure, rather than limit the patent scope of the present disclosure. All equivalent structure or equivalent process changes made using the contents of the specification and drawings of the present disclosure, which are directly or indirectly applied in other related technical fields, are included in the scope of protection of the present disclosure.

What is claimed is:

1. A multi-sensor synchronous non-contact measuring probe of an infrared thermometer, comprising a sensor fixing sleeve and a pressing block arranged at the inner end of the sensor fixing sleeve, wherein at least two infrared sensors are arranged on the pressing block, the sensor fixing sleeve is provided with optical channels with a same number as that of the infrared sensors, a detection surface of each of the infrared sensors is interfaced with a corresponding optical channel, and the infrared sensors are connected with micro-controller unit chips;

wherein the optical channels are spaced from each other at the sensor fixing sleeve.

2. The multi-sensor synchronous non-contact measuring probe of an infrared thermometer according to claim 1, wherein the pressing block is a hardware plate.

3. The multi-sensor synchronous non-contact measuring probe of an infrared thermometer according to claim 2, wherein the pressing block is fixedly installed on the inner end of the sensor fixing sleeve through fasteners.

4. The multi-sensor synchronous non-contact measuring probe of an infrared thermometer according to claim 1, wherein the optical channels of each of the infrared sensors are arranged in parallel with each other, so that the detection areas obtained by the infrared sensors are staggered or have overlapping edges; alternatively, the optical channels of each of the infrared sensors are arranged at an oblique angle, so that the centers of the detection areas obtained by the infrared sensors are overlapped with each other.

5. The multi-sensor synchronous non-contact measuring probe of an infrared thermometer according to claim 1, wherein the optical channel is parabolic or triangular, elliptical or stepped.

6. The multi-sensor synchronous non-contact measuring probe of an infrared thermometer according to claim 1, wherein at least one of the optical channels is circular, and the other one of the optical channels is elongated.

7. A multi-sensor synchronous non-contact measuring probe of an infrared thermometer, comprising a sensor fixing sleeve and a pressing block arranged at the inner end of the sensor fixing sleeve, wherein at least two infrared sensors are arranged on the pressing block, the sensor fixing sleeve is provided with optical channels with a same number as that of the infrared sensors, a detection surface of each of the infrared sensors is interfaced with a corresponding optical channel, and the infrared sensors are connected with micro-controller unit chips;

wherein at least one of the at least two infrared sensors corresponds to a circular optical path through the optical channel directing at a target area of a body head, and the other one of the at least two infrared sensors corresponds to an elongated optical path through the optical channel directing at an elongated acquisition area at a position of blood vessels below the target area.

* * * * *